United States Patent
Lee et al.

(10) Patent No.: US 9,580,585 B2
(45) Date of Patent: Feb. 28, 2017

(54) HIGH-FLOW AND HIGH-IMPACT POLYOLEFIN RESIN COMPOSITION

(71) Applicants: HYUNDAI MOTOR COMPANY, Seoul (KR); KIA MOTORS CORPORATION, Seoul (KR); LOTTE CHEMICAL CORPORATION, Seoul (KR)

(72) Inventors: Yong Bum Lee, Seoul (KR); Seok Hwan Kim, Suwon-si (KR); Jong Hyun Kim, Bucheon-si (KR); Byung Kook Nam, Daejeon (KR); Sung Min Cho, Daejeon (KR); Noh Gyoung Kim, Daejeon (KR)

(73) Assignees: HYUNDAI MOTOR COMPANY, Seoul (KR); KIA MOTORS CORPORATION, Seoul (KR); LOTTE CHEMICAL CORPORATION, Seoul (KR)

( * ) Notice: Subject to any disclaimer, the term of this patent is extended or adjusted under 35 U.S.C. 154(b) by 0 days.

(21) Appl. No.: 14/863,419

(22) Filed: Sep. 23, 2015

(65) Prior Publication Data
US 2016/0160017 A1    Jun. 9, 2016

(30) Foreign Application Priority Data

Dec. 3, 2014    (KR) .................... 10-2014-0172483

(51) Int. Cl.
*C08L 23/12*    (2006.01)
(52) U.S. Cl.
CPC ......... *C08L 23/12* (2013.01); *C08L 2205/035* (2013.01)
(58) Field of Classification Search
CPC ........................... C08L 23/12; C08L 2205/035
USPC ....................................................... 524/528
See application file for complete search history.

(56) References Cited

U.S. PATENT DOCUMENTS

| | | | | |
|---|---|---|---|---|
| 5,986,009 | A * | 11/1999 | Thoen | ............ C08L 23/10 525/232 |
| 2003/0170477 | A1* | 9/2003 | Jeong | ............ C08L 23/0815 428/500 |

FOREIGN PATENT DOCUMENTS

| | | |
|---|---|---|
| JP | 09-094925 A | 4/1997 |
| JP | 2002-146134 A | 5/2002 |
| KR | 10-2000-0057837 A | 9/2000 |
| KR | 10-0286857 B1 | 1/2001 |
| KR | 10-2001-0107310 A | 12/2001 |
| KR | 10-2002-0034425 A | 5/2002 |
| KR | 10-0361596 B1 | 1/2003 |
| KR | 10-2005-0121558 A | 12/2005 |
| KR | 10-2007-0048992 A | 5/2007 |
| KR | 10-0951769 B1 | 4/2010 |
| KR | 10-2011-0101202 A | 9/2011 |
| KR | 10-1124329 B1 | 3/2012 |
| KR | 10-2013-0019436 A | 2/2013 |
| WO | 2004/113442 A1 | 12/2004 |

OTHER PUBLICATIONS

English Machine Translation of KR 10-2001-0107310, Dec. 7, 2001.*

* cited by examiner

*Primary Examiner* — Angela C Scott
(74) *Attorney, Agent, or Firm* — McDermott Will & Emery LLP

(57) ABSTRACT

A high-flow and high-impact polyolefin resin composition comprises: about 5 to 96% by weight of an isotactic polypropylene-based resin; about 1 to 15% by weight of a low molecular weight atactic polypropylene resin having weight average molecular weight of about 10,000 to 100,000 g/mol; about 1 to 20% by weight of an ultra-high molecular weight atactic polypropylene resin having weight average molecular weight of about 1,000,000 to 2,500,000 g/mol; about 1 to 40% by weight of an inorganic filler; and about 1 to 20% by weight of a rubber.

11 Claims, No Drawings

HIGH-FLOW AND HIGH-IMPACT POLYOLEFIN RESIN COMPOSITION

CROSS-REFERENCE TO RELATED APPLICATION

This application claims under 35 U.S.C. §119(a) the benefit of priority to Korean Patent Application No. 10-2014-0172483 filed on Dec. 3, 2014, the entire content of which is incorporated herein by reference.

TECHNICAL FIELD

The present disclosure relates to a high-flow and high-impact polyolefin resin composition. More particularly, the present disclosure relates to a polyolefin resin composition having excellent fluidity, impact strength, and improved properties such as tensile strength and flexural modulus.

BACKGROUND

Polypropylene can be classified into atactic, syndiotactic, and isotactic propylene according to its three-dimensional structure. In general, commercially available polypropylene is isotactic polypropylene, and has excellent mechanical properties due to its high crystallinity, but has the shortcoming of reduced impact resistance.

Accordingly, adding rubber such as ethylene-$\alpha$-olefin copolymer can improve impact resistance. However, the poor compatibility of the rubber with polypropylene may lead to a whitening phenomenon under external pressure or impact, and this may lead to inferior appearance.

Conventionally, a polypropylene resin composition is used, which is manufactured using propylene polymer having weight average molecular weight of about 10,000 to 100,000 g/mol, and it has excellent fluidity. When the content of the low molecular weight polypropylene resin is relatively high, the appearance may be excellent, but it suffers from reduced impact resistance.

Further, a polypropylene resin composition is used, which is manufactured using atactic polypropylene having weight average molecular weight of about 20,000 to 200,000 g/mol, but there is a limit to how much one can improve its impact resistance due to its low weight average molecular weight.

Thus, there is a need for a polyolefin resin that can improve polypropylene's mechanical properties and also enhance its impact resistance.

The above information disclosed in this Background section is only for enhancing the understanding of the background of the present disclosure and therefore it may contain information that does not form the prior art that is already known in this country to a person of ordinary skill in the art.

SUMMARY OF THE DISCLOSURE

The present disclosure has been made in an effort to solve the above-described problems associated with the prior art. It describes how mixing low-molecular-weight atactic polypropylene and high-molecular-weight atactic polypropylene to an existing polyolefin resin containing isotactic polypropylene improves the resin's mechanical properties, fluidity, and impact strength.

An aspect of the present disclosure provides a high-flow and high-impact polyolefin resin composition having improved fluidity and impact strength.

Further, another aspect of the present disclosure provides an automotive interior and exterior molded article including the polyolefin resin composition.

The present disclosure is not limited to the above-described objects, and other objects and advantages of the present disclosure that have not been described will be understood by the following description, and become apparent with reference to the embodiments of the present disclosure. In addition, one of skill in the art will appreciate that other objects and advantages of the present disclosure will be easily realized by means shown in the appended patent claims, and combinations thereof.

In an embodiment of the present inventive concept, a high-flow and high-impact polyolefin resin composition includes about 5 to 96% by weight of an isotactic polypropylene-based resin; about 1 to 15% by weight of a low molecular weight atactic polypropylene resin with weight average molecular weight of about 10,000 to 100,000 g/mol; about 1 to 20% by weight of an ultra-high molecular weight atactic polypropylene resin with weight average molecular weight of about 1,000,000 to 2,500,000 g/mol; about 1 to 40% by weight of an inorganic filler; and about 1 to 20% by weight of a rubber.

The isotactic polypropylene resin may be at least one selected from the group consisting of: a random copolymer polymerized with comonomers selected from the group consisting of propylene, ethylene, butylene and octene; a block copolymer consisting of polypropylene and ethylene-propylene rubber; and a branched polypropylene.

The inorganic filler may be at least one selected from the group consisting of talc, calcium carbonate, calcium sulfate, magnesium oxide, calcium stearate, wollastonite, mica, silica, calcium silicate, nanoclay, whiskers, glass fiber, carbon fiber, graphite, graphene, and carbon black.

The rubber may be a thermoplastic elastomer rubber or a copolymer of ethylene and $C_2$~$C_{10}$ $\alpha$-olefin.

The thermoplastic elastomer rubber may be at least one selected from the group consisting of ethylene-propylene-rubber (EPR), ethylene-propylene-diene rubber (EPDM), ethylene-butene copolymer rubber (EBR), ethylene-octene copolymer rubber (EOR), and styrene-butadiene rubber (SBR).

The $C_2$~$C_{10}$ $\alpha$-olefin may be at least one selected from the group consisting of propylene, butene, pentene, hexene, propene and octene.

The high-flow and high-impact polyolefin resin composition may further include at least one additive selected from the group consisting of an antioxidant, a photostabilizer, a flame retardant, a colorant, a plasticizer, a heat stabilizer, a slip agent, and an antistatic agent.

In another embodiment of the present inventive concept, an automotive interior and exterior molded article includes the high-flow and high-impact polyolefin resin composition.

Other aspects and embodiments of the present disclosure are discussed infra.

The above and other features of the present disclosure are discussed infra.

It is understood that the term "vehicle" or "vehicular" or other similar terms as used herein is inclusive of motor vehicles in general such as passenger automobiles including sport utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

DETAILED DESCRIPTION

Hereinafter reference will now be made in detail to various embodiments of the present inventive concept, examples of which are illustrated in the accompanying drawings and described below. While the present disclosure will be described in conjunction with exemplary embodiments, it will be understood that this description is not intended to limit the present inventive concept to those exemplary embodiments. On the contrary, the present disclosure is intended to cover not only the exemplary embodiments, but also various alternatives, modifications, equivalents, and other embodiments, which may be included within the spirit and scope of the present disclosure as defined by the appended claims.

A high-flow and high-impact polyolefin resin composition of the present disclosure comprises: about 5 to 96% by weight of an isotactic polypropylene-based resin; about 1 to 15% by weight of a low molecular weight atactic polypropylene resin with weight average molecular weight of about 10,000 to 100,000 g/mol; about 1 to 20% by weight of an ultra-high molecular weight atactic polypropylene resin with weight average molecular weight of about 1,000,000 to 2,500,000 g/mol; about 1 to 40% by weight of an inorganic filler; and about 1 to 40% by weight of a rubber.

The isotactic polypropylene-based resin may be at least one selected from the group consisting of: a random copolymer polymerized with comonomers selected from the group consisting of propylene, ethylene, butylene and octene; a block copolymer consisting of polypropylene and ethylene-propylene rubber; and a branched polypropylene.

The low molecular weight atactic polypropylene resin has excellent impact strength because it lacks the crystallinity of the isotactic polypropylene, and it also has excellent compatibility because it consists of propylene molecules like isotactic polypropylene, thereby reducing the whitening phenomenon. Further, it has excellent fluidity because it is easy to control the molecular weight, thereby improving the appearance of an automotive molded article. This low molecular weight atactic polypropylene-based resin may have weight average molecular weight of about 10,000 to 100,000 g/mol. If its weight average molecular weight is less than about 10,000 g/mol, there may be reduced impact resistance due to its low molecular weight, and if its weight average molecular weight is over about 100,000 g/mol, its fluidity may be reduced due to its high molecular weight. For instance, its weight average molecular weight may be about 20,000 to 80,000 g/mol. According to the present disclosure, the low molecular weight atactic polypropylene resin may be present in an amount by weight of about 1 to 15%. Specifically, if the content is less than about 1% by weight, there may be a limit to fluidity increase, and if it is over about 15% by weight, impact strength may be reduced.

The ultra-high molecular weight atactic polypropylene resin having very high molecular weight may improve the impact strength of an automotive molded article. The ultra-high molecular weight atactic polypropylene resin may have weight average molecular weight of about 1,000,000 to 2,500,000 g/mol. If its weight average molecular weight is less than about 1,000,000 g/mol, there may be a limit to impact resistance improvement, and if it is over about 2,500,000 g/mol, there may be difficulty manufacturing the resin due to its high molecular weight. In one embodiment, its weight average molecular weight may be about 1,200,000 to 2,000,000 g/mol. According to the present disclosure, the ultra-high molecular weight atactic polypropylene resin may be present in an amount of about 1 to 20% by weight. If the content is less than about 1% by weight, there may be a limit to impact strength increase, and if it is over about 20% by weight, fluidity may be reduced.

The inorganic filler may be at least one selected from the group consisting of talc, calcium carbonate, calcium sulfate, magnesium oxide, calcium stearate, wollastonite, mica, silica, calcium silicate, nanoclay, whiskers, glass fiber, carbon fiber, graphite, graphene and carbon black. In one embodiment, it may be talc or glass fiber. The inorganic filler may be present in an amount of about 1 to 40% by weight. If the content is less than about 1% by weight, stiffness and hardness may be reduced, and if it is over about 40% by weight, the output may be limited.

The rubber may be a thermoplastic elastomer rubber or a copolymer of ethylene and $C_2$~$C_{10}$ α-olefin. The thermoplastic elastomer rubber may be at least one selected from the group consisting of ethylene-propylene-rubber (EPR), ethylene-propylene-diene rubber (EPDM), ethylene-butene copolymer rubber (EBR), ethylene-octene copolymer rubber (EOR), and styrene-butadiene rubber (SBR). For example, the ethylene-octene copolymer rubber (EOR) may be selected because it improves impact strength effectively due to its long-chain branched octene group, and its can also reduce relative stiffness. Further, the ethylene-butene copolymer rubber (EBR) may contain butene co-monomer in an amount of 50% or more, and have a melt index of about 0.5 to 150 g/10 min (190° C., 2.6 kgf) and density of about 0.868 to 0.885 g/cc. According to the present disclosure, the $C_2$~$C_{10}$ α-olefin may be at least one selected from the group consisting of propylene, butene, pentene, hexene, propene, and octene. The rubber may be present in an amount of about 1 to 20% by weight. If its content is less than about 1% by weight, impact strength may be reduced, and if it is over about 20% by weight, there may be a limit to fluidity and compatibility.

The polyolefin resin composition may also include at least one additive selected from the group consisting of an antioxidant, a photostabilizer, a flame retardant, a colorant, a plasticizer, a heat stabilizer, a slip agent, and an antistatic agent. The amount of each additive may be adjusted to the optimum range within the range known to be available to manufacture a polyolefin composition in consideration of total production amount and production processes. The additive may be further added at the step of mixing the polypropylene, the inorganic filler, and the polypropylene-based compatibilizer, and also it may be added after this mixing at a separate additional step.

The polyolefin resin composition includes the high-flow and high-impact polyolefin resin composition. The polyolefin composite may be manufactured by melt-extruding a mixture of isotactic polypropylene-based resin, low molecular weight atactic polypropylene resin, ultra-high molecular weight atactic polypropylene resin, an inorganic filler, and a rubber using a melt-extruder having two or more axes under conditions of screw rotation speed of about 200 or 1000 rpm and residence time of about 5 to 90 sec. It may be conducted under conditions of the screw rotation speed of about 300 to 800 rpm and the residence time of about 10 to 60 sec.

Specifically, in order to effectively induce shear flow and elongational flow required for mixing between resins and inorganic filler dispersion in the extruder, the screw rotation speed may be about 300 rpm or more, and in terms of preventing deterioration of polypropylene and metal hydroxide, it can be conducted at screw rotation speed of about 1,000 rpm or less.

Further, in order to fully mix the isotactic polypropylene resin, low molecular weight and ultra-high molecular weight atactic polypropylene-based resins, inorganic filler and rubber, the residence time in the extruder may be about 5 sec or longer, and in order to prevent deterioration and improve productivity, the residence time may be about 90 sec or shorter.

On the other hand, the automotive interior and exterior molded article of the present disclosure may include the polyolefin resin composition. For example, the automotive interior and exterior molded article may be an interior/exterior material such as bumper fascia, side sill molding, door trim, pillar trim, and the like.

Thus, the high-flow and high-impact polyolefin resin composition according to the present disclosure may have excellent fluidity and impact strength and improved properties such as tensile strength and flexural modulus, by mixing low molecular weight atactic polypropylene and high molecular weight atactic polypropylene to the existing polyolefin resin containing isotactic polypropylene.

EXAMPLES

The following examples illustrate the present disclosure and are not intended to limit the same.

Example

Materials

As major and minor materials, JM-370 (PP, Lotte Chemical), low molecular weight atactic polypropylene, LMW aPP (Mw 30,000 g/mol, Lotte Chemical) ultra-high molecular weight atactic polypropylene, UHMW aPP (Mw 1,200,000 g/mol, Lotte Chemical), EG-8842(EOR, DOW) and KC-400 (d50 8 μm talc, KOCH) were used.

Example 1

As shown in the following Table 1, JM-370/LMW aPP/UHMW aPP/EG-8842/KC-400 were mixed at weight ratio of 70/5/5/5/15, a polyolefin composite was manufactured using a Twin screw Extruder (screw diameter 30 mm, L/D 40) under extrusion conditions of extrusion temperature of 160 to 200° C. and screw rotation speed of 400 rpm, and then a sample was molded using an injection molding machine.

Examples 2 to 6 and Comparative Examples 1 to 5

Composition ingredients shown in the following Table 1 were mixed at a certain content ratio, polyolefin composites were manufactured by the same method with Example 1, and then samples were molded using an injection molding machine.

TABLE 1

| Content (wt %) | Example | | | | | | Comparative Example | | | | |
|---|---|---|---|---|---|---|---|---|---|---|---|
| | 1 | 2 | 3 | 4 | 5 | 6 | 1 | 2 | 3 | 4 | 5 |
| Isotactic Polypropylene | 70 | 65 | 60 | 65 | 60 | 55 | 70 | 65 | 60 | 75 | 75 |
| Low Molecular Weight Atactic Polypropylene | 5 | 5 | 5 | 10 | 10 | 10 | — | — | — | 5 | — |
| Ultra-high Molecular Weight Atactic Polypropylene | 5 | 10 | 15 | 5 | 10 | 15 | — | — | — | — | 5 |
| Rubber | 5 | 5 | 5 | 5 | 5 | 5 | 15 | 20 | 25 | 5 | 5 |
| Inorganic Filler | 15 | 15 | 15 | 15 | 15 | 15 | 15 | 15 | 15 | 15 | 15 |

* Isotactic polypropylene: JM-370 (Lotte Chemical)
* Low molecular weight atactic polypropylene: LMW aPP (Mw 30,000 g/mol, Lotte Chemical)
* Ultra-high molecular weight atactic polypropylene: UMMW aPP (Mw 1,200,000 g/mol, Lotte Chemical)
* Inorganic filler: KC-400 (d50 8 μm talc, KOCH)
* Rubber: EG-8842 (EOR, DOW)

Test Example

In order to confirm property characteristics of the polyolefin composites manufactured in Examples 1 to 6 and Comparative Examples 1 to 5, properties were measured by the following methods, and the results were shown in the following Table 2.

[Property Measuring Method]

1) MI (230° C., 2.16 kg): measured according to ASTM Test Method D1238.

2) Tensile Strength (Breakdown): measured according to ASTM Test Method D638.

3) Flexural Modulus: measured according to ASTM Test Method D790.

4) IZOD Impact Strength: measured according to ASTM Test Method D256.

5) Heat Deflection Temperature: measured according to ASTM Test Method D648.

TABLE 2

| Properties | Example | | | | | | Comparative Example | | | | |
|---|---|---|---|---|---|---|---|---|---|---|---|
| | 1 | 2 | 3 | 4 | 5 | 6 | 1 | 2 | 3 | 4 | 5 |
| MI (g/10 min) | 35 | 32 | 30 | 64 | 60 | 55 | 20 | 13 | 8 | 42 | 20 |
| Tensile Strength (Breakdown) (Kg/cm$^2$) | 280 | 275 | 272 | 270 | 263 | 265 | 240 | 233 | 210 | 273 | 263 |
| Flexural | 23,000 | 22,500 | 21,800 | 21,500 | 20,600 | 20,300 | 20,200 | 18,000 | 15,300 | 23,300 | 23,200 |

TABLE 2-continued

| Properties | Example | | | | | | Comparative Example | | | | |
|---|---|---|---|---|---|---|---|---|---|---|---|
| | 1 | 2 | 3 | 4 | 5 | 6 | 1 | 2 | 3 | 4 | 5 |
| Modulus (Kg/cm$^2$) | | | | | | | | | | | |
| IZOD Impact Strength (@23° C.) (kg·cm) | 45 | 54 | 61 | 40 | 64 | 73 | 20 | 25 | 42 | 15 | 40 |
| Heat Deflection Temperature (° C.) | 127 | 123 | 117 | 115 | 115 | 113 | 110 | 105 | 95 | 125 | 123 |

According to the results of the above Table 2, it was found that the polyolefin composites (Comparative Examples 1 to 5) that do not use an atactic polypropylene-based resin, or use a low molecular weight atactic polypropylene resin or a ultra-high molecular weight atactic polypropylene independently, do not possess equally satisfy properties such as tensile strength, flexural modulus, and impact strength.

On the contrary, it was confirmed that in the case of the polyolefin composites (Examples 1 to 6) containing a mixture of low molecular weight atactic polypropylene resin and ultra-high molecular weight atactic polypropylene resin, when using the low molecular weight atactic polypropylene resin and the ultra-high molecular weight atactic polypropylene resin at the same time, fluidity and impact strength are improved while properties such as tensile strength and flexural modulus are also improved.

Thus, it was confirmed that the polyolefin resin compositions manufactured in Examples 1 to 6 have excellent fluidity and impact strength and improved properties such as tensile strength and flexural modulus, by mixing low molecular weight atactic polypropylene and high molecular weight atactic polypropylene to the existing polyolefin resin containing isotactic polypropylene.

The high-flow and high-impact polyolefin resin composition according to the present disclosure may have excellent fluidity and impact strength and improved properties such as tensile strength and flexural modulus, by mixing low molecular weight atactic polypropylene and high molecular weight atactic polypropylene to the existing polyolefin resin containing isotactic polypropylene.

The present disclosure has been described in detail with reference to embodiments thereof. However, it will be appreciated by those of skill in the art that changes may be made to these embodiments without departing from the principles and spirit of the present disclosure, the scope of which is defined in the appended claims and their equivalents.

What is claimed is:

1. A high-flow and high-impact polyolefin resin composition comprising:
    about 5 to 96% by weight an isotactic polypropylene-based resin;
    about 1 to 15% by weight a low molecular weight atactic polypropylene resin having weight average molecular weight of about 10,000 to 100,000 g/mol;
    about 1 to 20% by weight an ultra-high molecular weight atactic polypropylene resin having weight average molecular weight of about 1,000,000 to 2,500,000 g/mol;
    about 1 to 40% by weight an inorganic filler; and
    about 1 to 20% by weight a rubber.

2. The high-flow and high-impact polyolefin resin composition of claim 1, wherein the isotactic polypropylene resin is at least one selected from the group consisting of: a random copolymer polymerized with comonomers selected from the group consisting of propylene, ethylene, butylene, and octene; a block copolymer containing polypropylene and ethylene-propylene rubber; and a branched polypropylene.

3. The high-flow and high-impact polyolefin resin composition of claim 1, wherein the inorganic filler is at least one selected from the group consisting of talc, calcium carbonate, calcium sulfate, magnesium oxide, calcium stearate, wollastonite, mica, silica, calcium silicate, nanoclay, whiskers, glass fiber, carbon fiber, graphite, graphene, and carbon black.

4. The high-flow and high-impact polyolefin resin composition of claim 3, wherein the inorganic filler is talc or glass fiber.

5. The high-flow and high-impact polyolefin resin composition of claim 1, wherein the rubber is a thermoplastic elastomer rubber or a copolymer of ethylene and $C_2$~$C_{10}$ α-olefin.

6. The high-flow and high-impact polyolefin resin composition of claim 5, wherein the thermoplastic elastomer rubber is at least one selected from the group consisting of ethylene-propylene-rubber (EPR), ethylene-propylene-diene rubber (EPDM), ethylene-butene copolymer rubber (EBR), ethylene-octene copolymer rubber (EOR), and styrene-butadiene rubber (SBR).

7. The high-flow and high-impact polyolefin resin composition of claim 5, wherein the $C_2$~$C_{10}$ α-olefin is at least one selected from the group consisting of propylene, butene, pentene, hexene, propene, and octene.

8. The high-flow and high-impact polyolefin resin composition of claim 1, wherein the ultra-high molecular weight atactic polypropylene resin has weight average molecular weight of about 1,200,000 to 2,000,000 g/mol.

9. The high-flow and high-impact polyolefin resin composition of claim 1, wherein the low molecular weight atactic polypropylene resin has weight average molecular weight of about 20,000 to 80,000 g/mol.

10. The high-flow and high-impact polyolefin resin composition of claim 1, further comprising at least one additive selected from the group consisting of an antioxidant, a photostabilizer, a flame retardant, a colorant, a plasticizer, a heat stabilizer, a slip agent, and an antistatic agent.

11. An automotive interior and exterior molded article comprising a polyolefin resin composition selected from the high-flow and high-impact polyolefin resin compositions of claim 1.

* * * * *